US012609329B2

(12) United States Patent
Yildirim et al.

(10) Patent No.: US 12,609,329 B2
(45) Date of Patent: Apr. 21, 2026

(54) CELL STACK AND PRODUCTION THEREOF

(71) Applicant: Robert Bosch GmbH, Stuttgart (DE)

(72) Inventors: Ali Riza Yildirim, Kirchheim A.N. (DE); Harald Schmeisser, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 580 days.

(21) Appl. No.: 18/248,144

(22) PCT Filed: Sep. 30, 2021

(86) PCT No.: PCT/EP2021/076895
§ 371 (c)(1),
(2) Date: Apr. 26, 2023

(87) PCT Pub. No.: WO2022/073833
PCT Pub. Date: Apr. 14, 2022

(65) Prior Publication Data
US 2023/0369614 A1     Nov. 16, 2023

(30) Foreign Application Priority Data
Oct. 8, 2020     (DE) ..................... 10 2020 212 744.1

(51) Int. Cl.
*H01M 8/0258* (2016.01)
*C25B 9/60* (2021.01)
(Continued)

(52) U.S. Cl.
CPC ............. *H01M 8/0258* (2013.01); *C25B 9/60* (2021.01); *H01M 8/188* (2013.01); *H01M 2008/1095* (2013.01)

(58) Field of Classification Search
CPC ............... H01M 8/0258; H01M 8/188; H01M 2008/1095; C25B 9/60
(Continued)

(56) References Cited

U.S. PATENT DOCUMENTS

2005/0058878 A1* 3/2005 Martin ................ H01M 8/2404
264/328.17
2005/0238939 A1 10/2005 An et al.
(Continued)

FOREIGN PATENT DOCUMENTS

CN        105355941 B      4/2018
DE   102015103924 A1      9/2015
(Continued)

OTHER PUBLICATIONS

English translation of Written Opinion for PCT/EP2021/076895. (Year: 2021).*
(Continued)

*Primary Examiner* — Patricia L. Hailey
(74) *Attorney, Agent, or Firm* — Michael Best & Friedrich LLP

(57)            ABSTRACT

The presented invention relates to a cell stack (100) for distributing media in a system (101), wherein the cell stack (100) comprises:
   a multiplicity of media distributor plates (103*a*, 103*b*, 103*c*, 301, 303),
   a multiplicity of intermediate layers (105*a*, 105*b*, 105*c*, 105*d*),
wherein respective intermediate layers (105*a*, 105*b*, 105*c*, 105*d*) are arranged between two media distributor plates (103*a*, 103*b*, 103*c*, 301, 303) and electrically isolate the latter from one another, and wherein at least the respective media distributor plates (103*a*, 103*b*, 103*c*, 301, 303) are arranged in alignment with one another in the cell stack (100), so that an outer edge (109) of the media distributor stack (100) is formed by at least respective edges of the media distributor plates (103*a*, 103*b*, 103*c*, 301, 303).
The presented invention also relates to a production method (200).

10 Claims, 2 Drawing Sheets

(51) Int. Cl.
   *H01M 8/10*          (2016.01)
   *H01M 8/18*          (2006.01)
(58) Field of Classification Search
   USPC .......................................................... 429/513
   See application file for complete search history.

(56)                    References Cited

U.S. PATENT DOCUMENTS

| | | | |
|---|---|---|---|
| 2016/0064766 A1* | 3/2016 | Hashimoto | ......... H01M 8/0206 |
| | | | 429/460 |
| 2017/0229717 A1 | 8/2017 | Luong et al. | |
| 2021/0075050 A1* | 3/2021 | Stoehr | ................. H01M 8/0297 |
| 2022/0093952 A1* | 3/2022 | Speidel | ..................... C25B 9/63 |

FOREIGN PATENT DOCUMENTS

| | | | |
|---|---|---|---|
| DE | 102014221351 A1 | 4/2016 |
| JP | 2005056820 A | 3/2005 |
| JP | 2007103152 A | 4/2007 |
| JP | 2007250492 A | 9/2007 |
| JP | 2008016361 A | 1/2008 |
| JP | 2018129164 A | 8/2018 |
| WO | 2009082406 A1 | 7/2009 |

OTHER PUBLICATIONS

Translation of International Search Report for Application No. PCT/EP2021/076895 dated Dec. 22, 2021 (2 pages).

* cited by examiner

CELL STACK AND PRODUCTION THEREOF

BACKGROUND

In cell stacks, such as those found in fuel cells or electrolyzers, cells are stacked on top of one another in order to increase a usable stress or to increase a media flow rate. Such cells alternately consist of the active component (often referred to as "MEA"—"membrane electrode assembly"—in a fuel cell stack) and a media distributor plate (also referred to as a bipolar plate in the fuel cell), which in turn can consist of further components.

For cost reasons and for space savings reasons, it is advantageous to minimize the material thicknesses of respective media distributor plates, which can result in edges of the media distributor plate being deformed during a production method, during transport, or upon integration into an end system. In extreme cases, such deformation can cause adjacent media distributor plates to touch and thus result in a short circuit in the media distributor plate stack.

It is known that respective isolating intermediate layers, for example a so-called "subgasket" or an edge reinforcement extend so far beyond the respective media distributor plates of a cell stack that no short circuit can arise, even in case of a bent edge of the media distributor plates.

SUMMARY

In the context of the presented invention, a cell stack and a production method are presented. Further features and details of the invention arise from the description and the drawings. Of course, features and details described in connection with the cell stack according to the invention also apply in connection with the production method according to the invention, and respectively vice versa, so that with respect to the disclosure, mutual reference to the individual aspects of the invention is or can always be made.

The invention presented serves in particular to provide a compact and robust cell stack. In particular, the invention presented serves to provide a compact and robust fuel cell stack.

Thus, in a first aspect of the invention presented, a cell stack for distributing media in a system is presented. The cell stack comprises a multiplicity of media distributor plates and a multiplicity of intermediate layers, wherein respective intermediate layers are arranged between and electrically isolate two media distributor plates, and wherein at least the respective media distributor plates are arranged in alignment with one another in the cell stack so that an outer edge of the media distributor stack is formed at least by respective edges of the media distributor plates.

In the context of the invention presented, a media distributor plate is understood to mean a planar structure for guiding at least one medium, such as hydrogen, within a system, such as a fuel cell.

In the context of the invention presented, an intermediate layer is understood to mean an electrical isolation layer arranged between two media distributor plates, such as a so-called "active layer" of a fuel cell system.

The presented cell stack is based on media distributor plates and intermediate layers that are alternately stacked on top of one another. At least the media distributor plates are arranged in alignment with one another. Accordingly, respective ends of the media distributor plates that are particularly hard form an edge of the presented cell stack.

Due to the fact that the edge of the presented cell stack is at least partially formed by media distributor plates, the edge of the cell stack is particularly hard and correspondingly resilient. This means that the cell stack is very robust against a deformation and can accordingly be easily introduced into a target system, such as a fuel cell system, and aligned on the edge.

In particular, the construction of the presented cell stack allows for individual layers to be stacked along alignment rails or the like without the anticipation of an increased risk of short circuits. In addition, the construction of the presented cell stack prevents damage when inserting the cell stack into respective pockets.

It can be provided that the media distributor plates are arranged in alignment with one another and with the intermediate layers of the presented cell stack, so that the media distributor plates and the intermediate layers together form the edge of the cell stack.

An isolating layer provided on respective media distributor plates, such as a plastic layer, prevents an electrical short circuit between respectively touching media distributor plates upon contact between two media distributor plates, which can occur, for example, by bending one or more media distributor plates.

It can further be provided that respective media distributor plates are surrounded on an edge on an anode side and/or at least at the outer edge on a cathode side by the electrically isolating layer.

The isolating layer can be arranged circumferentially or partially on respective media distributor plates, but always surrounds an edge region, i.e. an outer edge of a respective media distributor plate, which forms an edge of the presented cell stack.

It can further be provided that respective media distributor plates comprise a first plate and a second plate arranged opposite the first plate, and burr formed at respective ends of the first plate and/or the second plate face towards the respective opposing plate.

In the production of a media distributor plate, cutting edges or burrs can arise, which, upon contact with structures such as plastic isolation layers, can quickly lead to severe damage. In case of burrs of plates of a media distributor plate which face one another, i.e. face a respective opposite plate, damage by the burrs to structures adjacent to the media distributor plate or surrounding the media distributor plate, such as an isolation layer, can be avoided.

It can further be provided that at least one media distributor plate comprises a first plate and a second plate arranged opposite the first plate, wherein the first plate and/or the second plate comprises at least one bead, which extends in the direction of a respective adjacently arranged media distributor plate and, in the event of deformation of the at least one media distributor plate, first contacts the adjacently arranged media distributor plate in order to prevent further parts of the at least one media distributor plate from contacting the adjacently arranged media distributor plate.

A bead, such as a protrusion of material or an elevation of a base material, in particular an elevation in a material forming a plate of a media distributor plate, acts as a buffer zone upon deformation of the media distributor plate, which buffer zone first contacts structures adjacent to the media distributor plate and absorbs kinetic energy when moving the media distributor plate. By receiving the kinetic energy through the beading, the movement of the media plate itself is limited, and a contacting of in particular live regions of the media distributor plate with the adjacent structure is avoided.

A bead can be arranged on a respective media distributor plate and can be made of a flexible material, for example, or can be formed by a material forming the media distributor plate itself.

It can further be provided that the cell stack is configured so as to distribute media in a system of the following list of systems: fuel cell system, electrolyzer, and redox flow system.

The presented cell stack is suitable for use in any electrochemical unit that relies upon a stacking of electrically conductive components with an isolating intermediate layer, such as a PEM fuel cell system.

In a second aspect, the presented invention relates to a production method for producing a possible configuration of the presented cell stack. The presented production method comprises an arrangement step for arranging respective media distributor plates of a multiplicity of media distributor cells so as to alternate with respective intermediate layers of a multiplicity of intermediate layers. Furthermore, the production method presented comprises an alignment step for aligning at least the media distributor plates so that the respective media distributor plates are aligned with one another in the cell stack, and an outer edge of the cell stack is formed at least by respective edges of the media distributor plates.

Due to the alignment step provided according to the invention, the arrangement step is significantly less prone to stacking errors, as are known for example due to a pressing or folding of an edge reinforcement in a production method according to the prior art. Furthermore, a more precise and cost-efficient stacking of the media distributor plates and the intermediate layers is possible than in a production method according to the prior art, because, in a configuration of the presented production method, individual layers of media distributor plates can be mechanically struck on an alignment element.

It can be provided that the production method further comprises an isolation step in which respective media distributor plates are surrounded at least on an outer edge by an electrically isolating layer.

The electrically isolating layer can be, for example, a plastic or a wax. For example, respective media distributor plates can be placed at least in regions in a bath with a liquid electrical isolator prior to the arrangement step of the presented production method and subsequently cured. Alternatively, an electrical isolator can be placed on respective media distributor plates after the arrangement step, e.g. by turning over.

It can furthermore be provided that the production method comprises a provisioning step for providing the media distributor plates by a punching process, in which edges of respective media distributor plates are punched burr-free in a fine-punching process or respective burrs resulting from the punching process are removed or respective burrs resulting from the punching process are deformed, so that the burrs of a respective plate of a media distributor plate face towards an opposing plate of the media distributor plate, or a cutting burr direction is selected in the cutting method, so that burrs of a respective plate of a media distributor plate face towards a respective opposing plate of the media distributor plate.

In particular, in order to prevent damage to an electrically isolating layer applied to respective media distributor plates, a cutting edge-free or burr-free geometry of respective media distributor plates is helpful. A deburring of respective media distributor plates can occur during a punching process for punching out the media distributor plates from a piece of sheet metal or thereafter in a separate working step. In particular, respective edges or burrs of a plate of a media distributor plate can be deformed after a punching process so that they face towards an oppositely arranged plate of the media distributor plate and correspondingly away from an isolating layer to be applied to the media distributor plate.

Further advantages, features, and details of the invention arise from the following description, in which embodiment examples of the invention are described in detail with reference to the drawings. The features mentioned in the claims and in the description can contribute individually or in any combination to the configuration of the presented invention.

DETAILED DESCRIPTION

Figure 1:
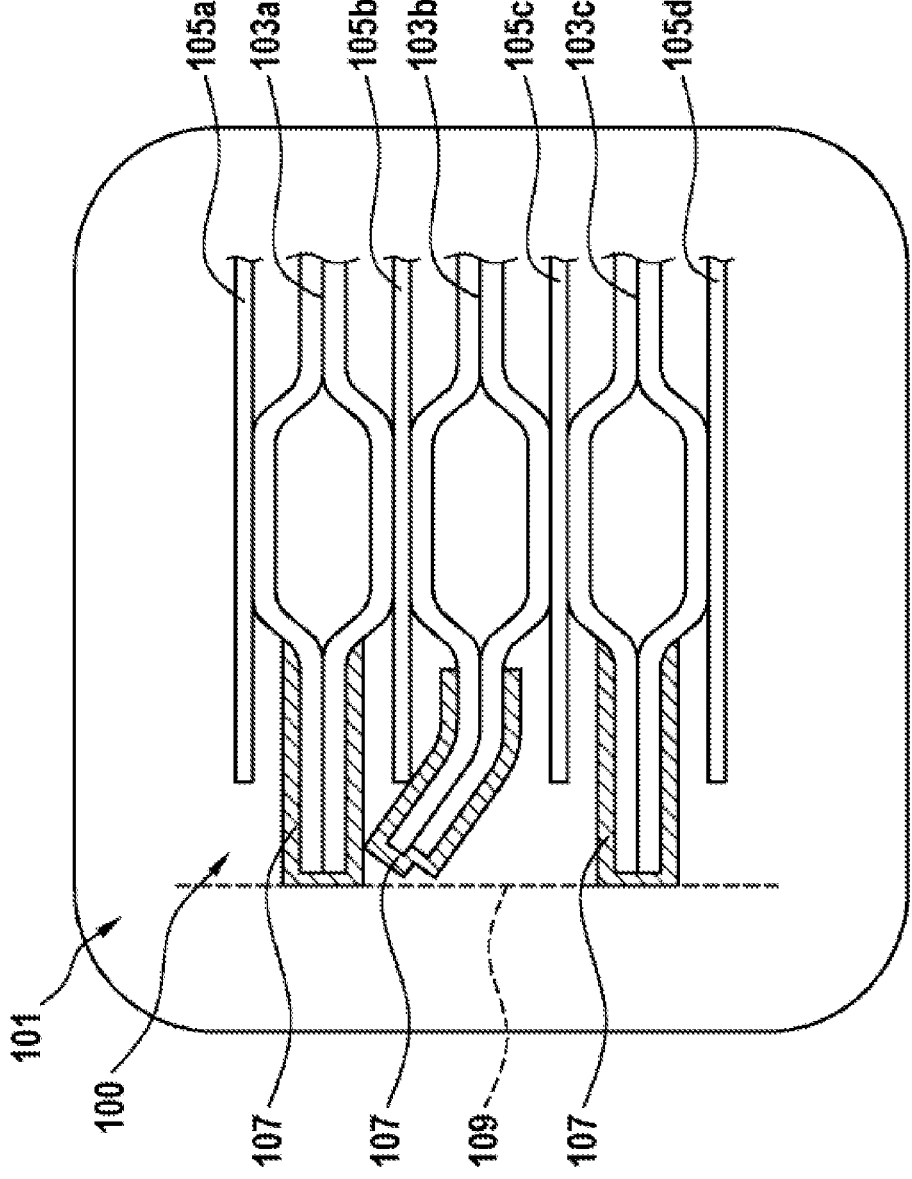
FIG. 1 a possible configuration of the presented fuel cell system.

In FIG. 1, a cell stack 100 is shown. The cell stack 100 is part of a system 101, such as a fuel cell system.

The cell stack 100 comprises a multiplicity of media distributor plates 103a, 103b, and 103c, and a multiplicity of intermediate layers 105a, 105b, 105c, and 105d.

The media distributor plates 103a, 103b and 103c are surrounded at their respective ends by an electrical isolator 107.

The media distributor plates 103a, 103b, and 103c are arranged in alignment with one another according to the present invention so that an edge 109 of the cell stack 100 is formed by respective ends of the media distributor plates 103a, 103b, and 103c.

In the present case, the media distributor plate 103b was deformed due to a mechanical pulse, as a result of which an end of the media distributor plate 103b pushes against an end of the media distributor plate 103c. Due to the electrical isolators 107 of the media distributor plates 103b and 103c, despite the contact of the media distributor plates 103b and 103c, no electrical current can flow between the media distributor plates 103b and 103c, so that a short circuit is avoided.

Figure 2:
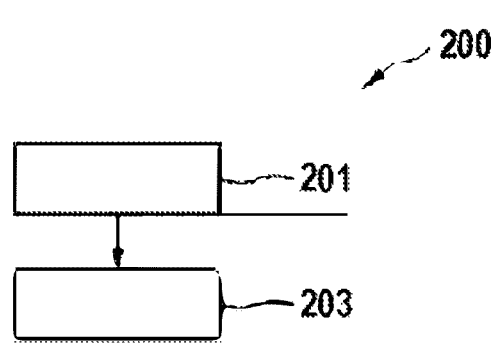
FIG. 2 a possible configuration of the presented production method.

In FIG. 2, a production method 200 for producing a possible configuration of the presented cell stack, e.g. the cell stack 100, is shown.

The production method 200 comprises an arrangement step 201 for arranging respective media distributor plates of a multiplicity of media distributor cells so as to alternate with respective intermediate layers of a multiplicity of intermediate layers.

Furthermore, the production method presented comprises an alignment step 203 for aligning at least the media distributor plates so that the respective media distributor plates are aligned with one another in the cell stack, and an outer edge of the cell stack is formed at least by respective edges of the media distributor plates.

To align the media distributor plates, the cell stack can be struck against a stop element repeatedly, e.g. upon application of an additional media distributor plate or upon application of a respective last media distributor plate on the cell stack.

Figure 3A:
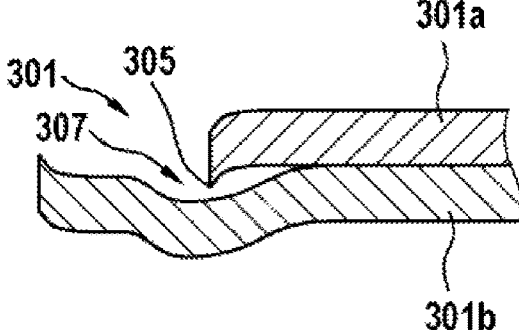
FIG. 3a a detailed illustration of an embodiment of a media distributor plate according to a first possible configuration of the presented cell stack.
Figure 3B:
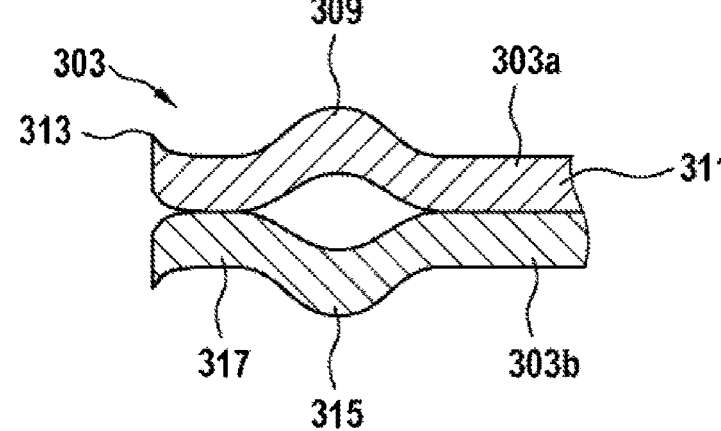
FIG. 3b a detailed illustration of an embodiment of a media distributor plate according to a second possible configuration of the presented cell stack.

In FIGS. 3a and 3b, a media distributor plate 301 and a media distributor plate 303 are shown.

The media distributor plate 301 comprises a first plate 301a and a second plate 301b. The first plate 301a is bent at its end towards the second plate 301b so that a burr 305 of the first plate 301a engages with a receptacle 307 of the second plate 301b, and an environment is protected from the burr 305.

In particular, due to the burr 305 arranged in the receptacle 307, damage by the burr 305 to an electrical isolator to be turned over via the first plate 301a and the second plate 301b can be avoided.

The media distributor plate 303 comprises a first plate 303a and a second plate 303b. The first plate 303a comprises a bead 309 that rises above a base region 311 of the first plate 303a. Accordingly, the bead 309 is bent outwardly away from the second plate 303b.

By flexing the bead 309, it is achieved that the bead 309 first collides with respective structures arranged in an environment of the media distributor plate 303 upon movement of the media distributor plate 303 and degrades a kinetic energy stored in the media distributor plate. Accordingly, a contact of the base region 311 with the respective structures is avoided. Accordingly, a burr 313 of the first plate 303a can be bent away from the second plate 303b, because it is protected from contact with further structures by the bead 309.

Analogously to the bead 309, the second plate 303b comprises a bead 315 that protects a base region 317 of the second plate 303b from contact with a structure in the environment of the media distributor plate 303.

The invention claimed is:

1. A cell stack (100) for distributing media in a system (101),
   wherein the cell stack (100) comprises:
      a plurality of media distributor plates (103a, 103b, 103c, 301, 303),
      a plurality of intermediate layers (105a, 105b, 105c, 105d),
   wherein respective intermediate layers (105a, 105b, 105c, 105d) are arranged between two media distributor plates (103a, 103b, 103c, 301, 303) and electrically isolate the media distributor plates from one another, and
   wherein at least the respective media distributor plates (103a, 103b, 103c, 301, 303) are arranged in alignment with one another in the cell stack (100), so that an outer edge (109) of the media distributor stack (100) is formed by at least respective edges of the media distributor plates (103a, 103b, 103c, 301, 303);
   wherein
   the respective media distributor plates (103a, 103b, 103c, 301, 303) include an outermost peripheral edge, and
   wherein an electrically isolating layer surrounds and covers the outermost peripheral edge.

2. The cell stack (100) according to claim 1,
   wherein
   respective media distributor plates (103a, 103b, 103c, 301, 303) are surrounded on an edge on an anode side and/or at least at the outer edge on a cathode side by the electrically isolating layer (107).

3. The cell stack (100) according to claim 1,
   wherein
   respective media distributor plates (103a, 103b, 103c, 301, 303) comprise a first plate (301a, 303a) and a second plate (301b, 303b) arranged opposite the first plate, and
   burrs formed at respective ends of the first plate (301a, 303a) and/or the second plate (301b, 303b) face towards the respective opposing plate.

4. The cell stack (100) according to claim 1,
   wherein
   respective media distributor plates (103a, 103b, 103c, 301, 303) comprise a first plate (301a, 303a) and a second plate (301b, 303b) arranged opposite the first plate (301a, 303a),
   wherein the second plate (301b) comprises a receptacle (307) for receiving a burr (305) of the first plate (301a), and
   wherein the first plate (301a) is arranged offset relative to the second plate (301b), and the burr (305) of the first plate (301a) is inserted into the receptacle (307) of the second plate (301b).

5. The cell stack (100) according to claim 1,
   wherein
   at least one media distributor plate (103a, 103b, 103c, 301, 303) comprises a first plate (301a, 303a) and a second plate (301b, 303b) arranged opposite the first plate (301a, 303a),
   wherein the first plate (301a, 303a) and/or the second plate (301b, 303b) comprises at least one bead (309, 315), which extends towards a respective adjacent arranged media distributor plate (103a, 103b, 103c, 301, 303) and, in the event of deformation of the at least one media distributor plate (103a, 103b, 103c, 301, 303), first contacts the adjacently arranged media distributor plate (103a, 103b, 103c, 301, 303) in order to prevent a contact of further parts of the at least one media distributor plate (103a, 103b, 103c, 301, 303) with the adjacently arranged media distributor plate (103a, 103b, 103c, 301, 303).

6. The cell stack (100) according to claim 1,
   wherein
   the cell stack (100) is configured to distribute media in a system (101) of the following list of systems: fuel cell system, electrolyzer, and redox flow system.

7. A production method (200) for producing a cell stack (100) according to claim 1,
   wherein the production method (200) comprises:
      arranging (201) respective media distributor plates (103a, 103b, 103c, 301, 303) of a plurality of media distributor plates (103a, 103b, 103c, 301, 303) alternately with respective intermediate layers of a plurality of intermediate layers (105a, 105b, 105c, 105d),
      aligning (203) the media distributor plates (103a, 103b, 103c, 301, 303) so that the respective media distributor plates (103a, 103b, 103c, 301, 303) are in alignment with one another in the cell stack, and an outer edge of the cell stack (100) is formed at least by respective edges of the media distributor plates (103a, 103b, 103c, 301, 303).

8. The production method (200) according to claim 7,
   wherein
   the production method (200) further comprises:
      surrounding respective media distributor plates (103a, 103b, 103c, 301, 303), at least on an outer edge, by an electrically isolating layer (107).

9. The production method (200) according to claim 7, wherein the production method (200) further comprises:

providing the media distributor plates (103*a*, 103*b*, 103*c*, 301, 303) by a punching process, in which edges of respective media distributor plates (103*a*, 103*b*, 103*c*, 301, 303) are punched burr-free in a fine-punching process or respective burrs (305) resulting from the punching process are removed after the punching process or respective burrs (305) resulting from the punching process are deformed after the punching process, so that the burrs (305) of a respective plate (301*a*) of a media distributor plate (301) face towards an opposing plate (301*b*) of the media distributor plate (301), or a cutting burr direction is selected in a cutting method, so that burrs (305) of a respective plate (301*a*) of a media distributor plate (301) face towards a respective opposing plate (301*b*) of the media distributor plate (301).

10. A production method (200) for producing a cell stack (100) comprising a plurality of media distributor plates (103*a*, 103*b*, 103*c*, 301, 303), a plurality of intermediate layers (105*a*, 105*b*, 105*c*, 105*d*), wherein respective intermediate layers (105*a*, 105*b*, 105*c*, 105*d*) are arranged between two media distributor plates (103*a*, 103*b*, 103*c*,

301, 303) and electrically isolate the media distributor plates from one another, and wherein at least the respective media distributor plates (103*a*, 103*b*, 103*c*, 301, 303) are arranged in alignment with one another in the cell stack (100), so that an outer edge (109) of the media distributor stack (100) is formed by at least respective edges of the media distributor plates (103*a*, 103*b*, 103*c*, 301, 303), wherein the production method (200) comprises:

arranging (201) respective media distributor plates (103*a*, 103*b*, 103*c*, 301, 303) of a plurality of media distributor plates (103*a*, 103*b*, 103*c*, 301, 303) alternately with respective intermediate layers of a plurality of intermediate layers (105*a*, 105*b*, 105*c*, 105*d*), aligning (203) the media distributor plates (103*a*, 103*b*, 103*c*, 301, 303) so that the respective media distributor plates (103*a*, 103*b*, 103*c*, 301, 303) are in alignment with one another in the cell stack, and an outer edge of the cell stack (100) is formed at least by respective edges of the media distributor plates (103*a*, 103*b*, 103*c*, 301, 303), and surrounding respective media distributor plates (103*a*, 103*b*, 103*c*, 301, 303), at least on an outer edge, by an electrically isolating layer (107).

* * * * *